United States Patent
Moeller et al.

(10) Patent No.: US 6,195,387 B1
(45) Date of Patent: Feb. 27, 2001

(54) VIDEO PROCESSING SYSTEM WITH REAL TIME PROGRAM DURATION COMPRESSION AND EXPANSION

(75) Inventors: Leonard Keith Moeller, Santa Clara; Christopher Scott Gifford, San Jose; William B. Hendershot, III, Saratoga, all of CA (US)

(73) Assignee: Prime Image, Inc., San Jose, CA (US)

( * ) Notice: Subject to any disclaimer, the term of this patent is extended or adjusted under 35 U.S.C. 154(b) by 0 days.

(21) Appl. No.: 09/426,844

(22) Filed: Oct. 26, 1999

Related U.S. Application Data

(62) Division of application No. 08/552,357, filed on Nov. 2, 1995, now Pat. No. 5,995,153.

(51) Int. Cl.[7] ............................................. H04N 7/12
(52) U.S. Cl. ........................ 375/240; 348/439; 386/54; 386/96
(58) Field of Search ..................... 375/240; 348/6–10, 348/390, 439; 386/4, 52, 54, 55, 64, 101, 125, 96; H04N 7/12

(56) References Cited

U.S. PATENT DOCUMENTS

| | | | |
|---|---|---|---|
| 3,748,381 | 7/1973 | Strobele et al. | 386/54 |
| 4,685,003 | 8/1987 | Westland | 386/52 |
| 4,754,342 | 6/1988 | Duffy | 386/55 |
| 5,057,932 | 10/1991 | Lang | 348/439 |
| 5,206,929 | 4/1993 | Langford et al. | 386/55 |
| 5,532,830 | 7/1996 | Schuler | 386/125 |
| 5,611,038 | 3/1997 | Shaw et al. | 348/390 |
| 5,659,350 | 8/1997 | Hendricks et al. | 348/6 |

*Primary Examiner*—Young Lee
(74) *Attorney, Agent, or Firm*—Limbach & Limbach LLP

(57) ABSTRACT

The running real time length of combined video and audio signal programs is shortened or lengthened by deleting or repeating individual fields or frames and corresponding amounts of audio segments. The video and audio portions of the programming material are separated and subjected to processing through a pair of program time changing units. The video portion is processed by deleting individual fields or frames on a manual, periodic or automatic basis. Manual deletion is done by an operator observing the program material on a monitor. Periodic deletion is performed automatically after the operator specifies the total amount of time (or number of fields or frames) to be deleted, with every ith frame or field deleted regardless of content. Automatic deletion is done in a fashion similar to periodic deletion, but the fields or frames are examined and are deleted on the basis of the amount of between frame motion. Audio segment deletion is done either manually, periodically or automatically, and the audio segments removed need not match the deleted frame video, but may be taken from different frames, so long as the total time length of the deleted audio segments equals the total time of the deleted video frames, and also provided that the differential delay between the processed video and processed audio does not exceed the lip sync criterion. A pause function disables the deletion or insertion process for program materials which may not be altered in any way.

14 Claims, 2 Drawing Sheets

VIDEO PROCESSING SYSTEM WITH REAL TIME PROGRAM DURATION COMPRESSION AND EXPANSION

This is a divisional of application Ser. No. 08/552,357, filed Nov. 2, 1995, U.S. Pat. No. 5,995,153.

BACKGROUND OF THE INVENTION

This invention relates to video signal processing methods and systems. More particularly, this invention relates to methods and systems for altering the content of video program material to expand or contract the total length of an entire program or program segment.

Video signal processing systems and methods are known for editing the content of an entire program or program segment in order to expand or contract the total program run time to match a desired run length or time segment. Frequently, a program or commercial which is scheduled for a predetermined broadcast time slot has a total running time which does not match exactly the time slot. In such cases, it is necessary to edit the program in order to fill the time slot exactly. In known systems, the program material must first be recorded on some suitable recording medium, such as magnetic tape, after which portions of the video program are deleted or repeated in order to contract or expand the running time to match the time slot. Such systems suffer from the disadvantage that the program to be edited cannot be simultaneously broadcast, but must be time delayed by the recording process. In addition, this technique is incompatible with live events, such as soccer matches, football games and the like, which must be broadcast and viewed substantially simultaneously. Efforts to date to provide real time video time editing to contract or expand the program length to match a desired run length have not met with success to date.

SUMMARY OF THE INVENTION

The invention comprises a method and system for providing real time video program expansion or contraction which is relatively inexpensive to implement, easy to operate, and effective matching program run time with a predetermined run length. In addition, the invention is effective in creating surplus broadcasting from any program in order to provide additional broadcast time for other information, such as commercial spots, public service announcements, and the like.

From a processing standpoint, the invention comprises a method of adjusting the total time length of a program having a fixed time duration by deleting or repeating individual frames or fields of video and audio segments on-the-fly, either on a fixed periodic basis, an automatic basis or manually using an operator controlled deletion or insertion circuit. The audio segments may or may not correspond to the frames or fields, but need only match the total time value of the deleted or repeated video frames or fields.

To contract a given program in the manual mode of operation, the operator monitors the video program material and deletes one frame or field at a time. A counter accumulates the time value of the sum of deleted frames or fields and displays this total to the operator. Once the desired amount of additional broadcast time has been accumulated, the original program material is permitted to be passed through unmodified. To expand a given program in the manual mode, the operator monitors the video program material and repeats one frame or field at a time, and the time accumulation counter keeps track of the total amount of time value of the repeated frames or fields and displays this information to the operator. Once the correct amount of time has been added to the original program material, the original program material is permitted to pass through unmodified. During the video deletion or repetition, corresponding segments of audio are deleted or repeated.

In the periodic mode of operation the operator enters the total amount of time to be deleted or added to the original program material length, and frames or fields and corresponding audio segments are deleted or added automatically in a periodic manner, e.g. one frame every five frames, one field every five fields, etc. The time counter accumulates the running total of deleted or added time, and terminates the deletion or insertion process when the running total equals the preselected amount.

In the automatic mode of operation, the operator adds the total amount of time to be deleted or added to the original program material length, and frames or fields and audio segments are deleted or added automatically, with the choice of particular frames/fields and audio segments being determined by video motion detectors and audio pitch and level detectors, so that optimal deletion or insertion is effected.

In both the periodic and automatic modes of operation, an optional pause function protects any specially selected sensitive programming material from being affected by the time change processing. The pause function itself may be manually controlled by an operator, or automatically performed by detecting special marker information inserted in predetermined frames/fields, or in reserved portions of same (i.e. during vertical blanking).

The invention enables on-the-fly adjustment of the running time of program material without affecting the actual broadcast of the program material. In addition, for programs of indeterminate length, the invention enables a fixed amount of time to be added or deleted over a preselected time period. For example, the invention can be used to gain a preselected fixed amount of time—e.g. ten minutes over a one hour broadcast time period—using either the manual or periodic modes of operation. Most importantly, the time deletion or insertion does not visibly affect the program content as experienced by the viewer, so that the program material can be enjoyed to the same extent as the original program material.

For a fuller understanding of the nature and advantages of the invention reference should be made to the ensuing detailed description of the invention, taken in conjunction with the accompanying drawings.

DETAILED DESCRIPTION OF THE PREFERRED EMBODIMENTS

Figure 1:
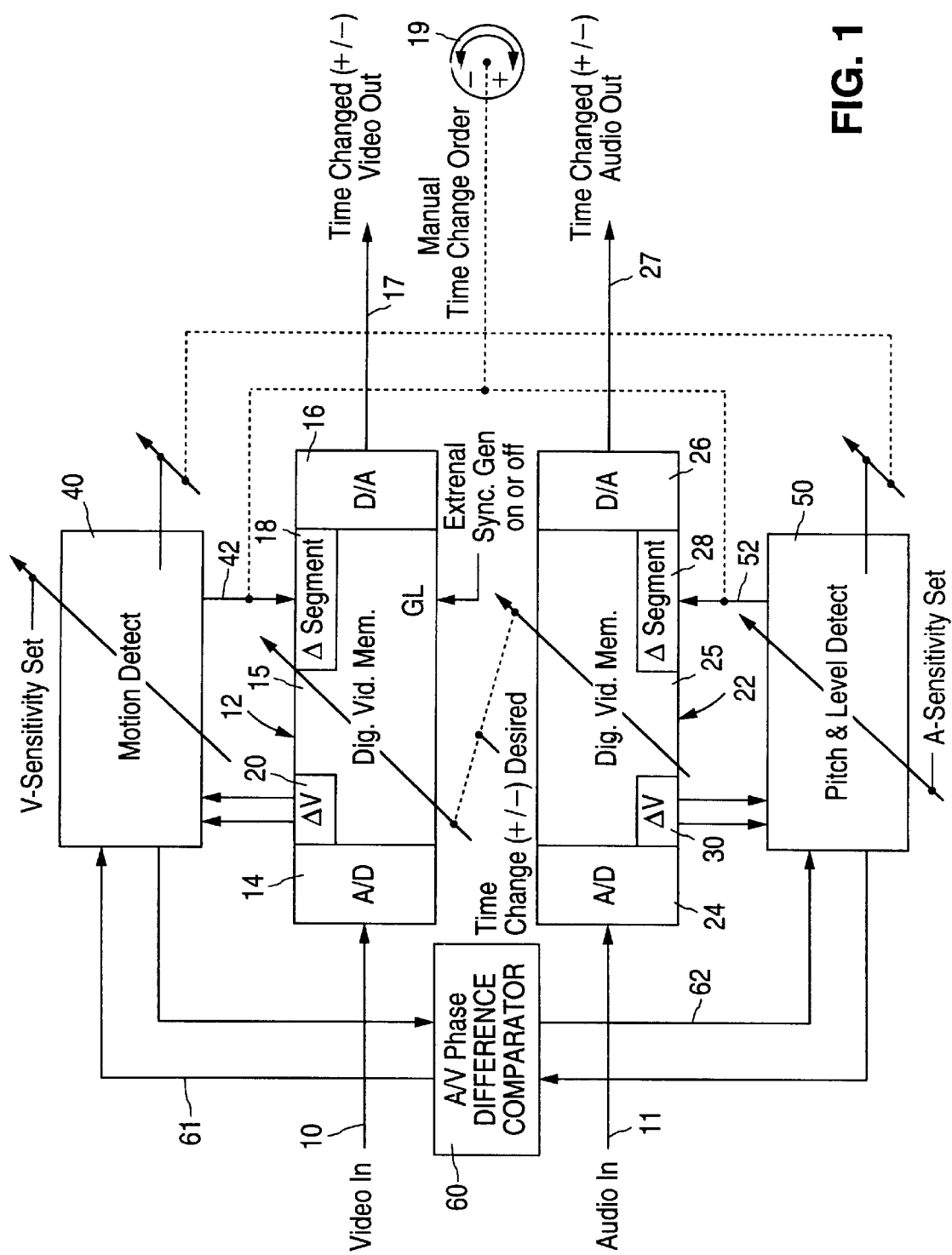
FIG. 1 is a block diagram of a video and audio processing system incorporating the invention.

Turning now to the drawings, FIG. 1 is a block diagram of a video and audio processing system incorporating the invention. As seen in this figure, the video and audio portions of standard program signals (e.g. NTSC, PAL, SECAN4 or the like) are initially separated into the individual video and audio components using conventional circuitry (not shown). The video portion is applied to the input of a first signal processor unit 12 incorporating an analog to digital converter 14, a digital video memory 15, and a digital to analog converter 16. The video is first converted from analog to digital form in analog to digital converter 14 and stored in digital video memory 15. Digital video output from digital video memory 15 is converted back to analog form in digital to analog converter 16 and supplied to a first output terminal 17 as time changed video.

Similarly, the audio portion of the programming material is supplied to an audio signal processing unit generally designated with reference numeral 22 and including an analog to digital converter 24, a digital audio memory 25, and a digital to analog converter 26. The audio portion of the programming material is thus converted from analog to digital form in analog to digital converter 24, stored in digital form in digital audio memory 25 and converted from digital to analog form in digital to analog converter 26. The analog output from digital to analog converter 26 is supplied to a second output terminal 27 as time changed audio. Analog to digital converters 14, 24 and digital to analog converter 16, 26 are conventional units having an appropriate bit size (e.g. 8 bits per sample) and a clocking speed compatible with the frequency content of their respective input signals. For example, the clock rate for analog to digital converter 14 used in the preferred embodiment is 13.5 MHz, although other clock frequencies may be employed so long as they comply with the known requirements of sampling theory. The bit size used in the preferred embodiment for analog to digital converter 24 is 16 bits per sample, and the clock rate employed is 48 KHz. Similar considerations apply to digital to analog converters 16 and 26.

Digital video memory 15 is a conventional digital storage unit having a capacity at least equal to the maximum accumulation time expected to be afforded by the system. For example, for a system designed to accumulate 30 seconds worth of frame time over a one-hour total interval, digital video memory 15 would have a capacity to store at least 900 frames of NTSC video. Similar considerations apply to digital audio memory 25: however, the total storage capacity of digital audio memory 25 may be substantially less than that of digital memory 15 due to the lower frequencies at which audio is conveyed. In the preferred embodiment, digital audio memory 25 has a storage capacity of 30 seconds (i.e., the same time storage capacity of digital video memory 15).

Video processing unit 15 incorporates circuitry termed a Δ segment circuit 18 which may be manually overridden by a manual video control 19. The purpose of the Δ segment circuitry 18 is to either delete or insert frames of video from the sequence of frames stored in digital video memory 15 on a programmed basis. Frame deletion is done by simply skipping over a frame in the normal sequence of frames and is described below with reference to FIG. 2. Frame insertion is accomplished by simply repeating a given frame in the frame sequence and is described below with reference to FIG. 3. In the periodic mode of operation, the frame deletion or insertion rate is set by the manual control 19, which the operator uses to dial in the total number of frames or amount of time to be deleted or added to the original program content during the initial stage of the signal processing. Thus, for example, if the operator wishes to delete ten seconds of time over a one-hour period, that number is entered by means of manual control 19 into the Δ segment circuit 18, and the circuitry periodically deletes every ith frame until a total of 10 seconds worth of frame time has been deleted or saved.

During the periodic frame deletion or insertion processing, a Δ V circuit 20 keeps track of the total time value of the deleted or inserted frames. Δ V circuit 20 essentially comprises a counter which receives frame deletion or insertion signals from the segment circuit 18 and either increments or decrements in response to each deleted or inserted frame.

Audio processing circuit 22 is provided with similar Δ segment circuitry 28 and Δ audio circuitry 30 for the similar purpose of deleting or adding audio segments and keeping track of the total time value of the segments deleted or inserted. Δ segment circuit 28 is controlled by manual control unit 19 in tandem with Δ segment circuit 18. However, the actual audio portions which are deleted or repeated need not correspond exactly to the same frames which are deleted or repeated by video processing unit 12: in fact, the audio portions which are deleted or inserted may be segments of audio signals from different frames. It is sufficient that any time delay between the video and the audio signal portions subjected to the time variation processing and presented to output terminals 17, 27 not exceed ±3 video frames, with a maximum difference of ±1 frame being preferred. By observing these constraints, no lip sync error is introduced to the original programming material in an observable fashion.

As indicated by the legends GL and External Sync Gen, the video processing unit 12 may be coupled to and driven by an external sync generator, such as a studio sync generator, so that the video processing can be done in synchronous fashion with other video broadcasting or reproduction equipment.

Figure 2:
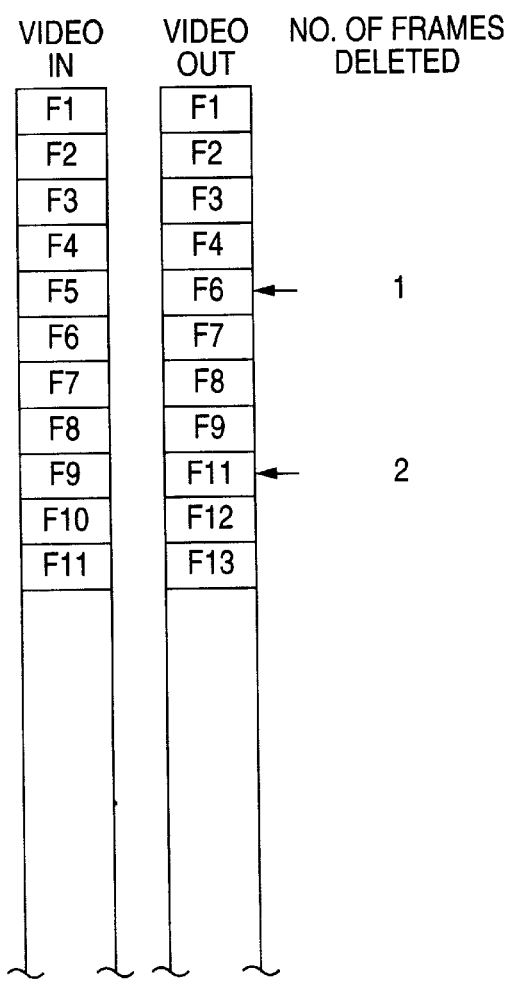
FIG. 2 is a schematic diagram illustrating the frame deletion process.
Figure 2:
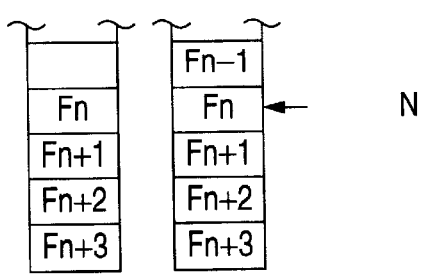

FIG. 2 is a schematic diagram illustrating the frame deletion process in either the periodic or manual mode. As schematically represented in this figure, the leftmost column represents the sequence of video frames incoming on input terminal 10 into the video processing unit 12. The middle column labeled video out represents the sequence of outgoing frames after processing is done. The rightmost column indicates the total number of frames deleted. The process begins by specifying with manual control unit 19 the number of frames to be deleted or the time value of these frames to the Δ segment unit 18. Thereafter, the first four frames (F1–F4) are simply passed through the processing unit 12 essentially unaffected. Frame 5 (F5), however, is deleted and replaced with frame 6 (F6), and frames 7–9 (F7–F9) are output in sequence after frame 6. Similarly, frame 10 (F10) is deleted, and frame 11 (F11) is output after frame 9 (F9). After five frame times, one frame is deleted; after ten frame times, two frames are deleted, etc. up until the desired total number of frames n (or the time corresponding thereto). Thereafter, the frames are simply passed through the digital video memory 15 essentially unaffected (since the total desired amount of time has already been accumulated).

During the frame deletion process, corresponding segments of audio are similarly deleted. However, the audio segments need not correspond exactly to the frames deleted. Stated differently, portions of audio from one frame may be deleted along with portions of audio from a preceding or succeeding frame; or all of the audio of a given frame may be deleted, as desired. The manner in which the audio segments are actually chosen for deletion will depend upon the frequency characteristics of the audio encountered, and are chosen in order to minimize the introduction of any audible noise signals into the final output signals.

Figure 3:
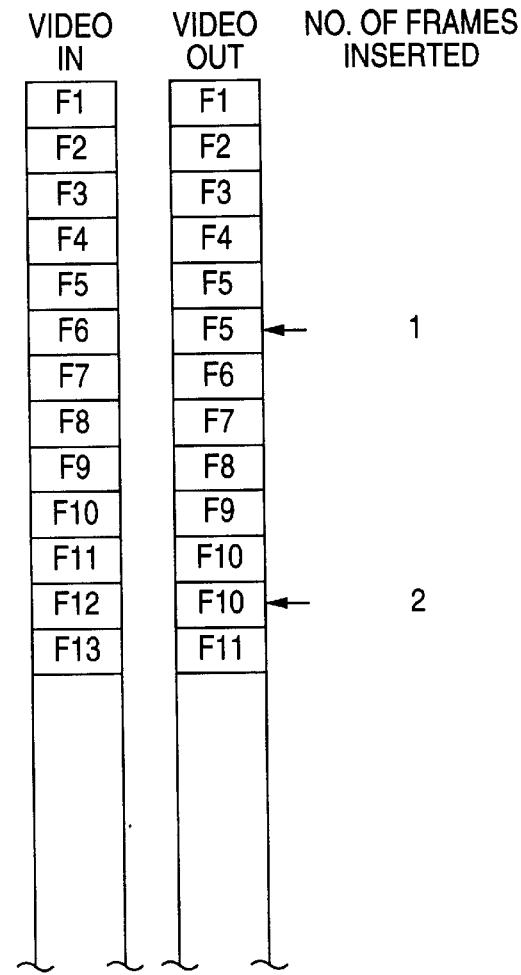
FIG. 3 is a schematic diagram illustrating the frame insertion process.
Figure 3:
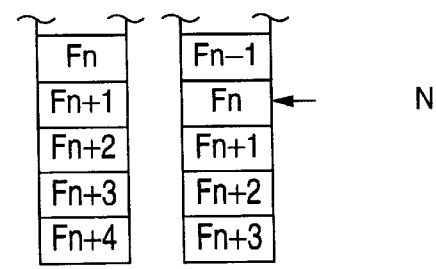

FIG. 3 is a schematic diagram illustrating the frame insertion process in order to expand the total run time of the program material. This process is essentially the reverse of the frame deletion process and proceeds by specifying the total number of frames or the time equivalent to be inserted into the length of the program material using manual control unit 19, followed by processing of the successive frames of video (and corresponding audio) to repeat every ith frame until the total number of frames (i.e., the desired time) have been accumulated.

Appendix A to this application contains a discussion of the time equations which apply to proper operation of the invention.

As noted above, Δ segment circuits 18, 28 can be manually overridden by manual control unit 19 to provide operator controlled frame insertion or frame deletion. In the preferred embodiment, manual control unit 19 includes a rotatable knob with a detent feel. Rotation of the knob in the clockwise direction provides one inserted frame per detent; while rotation of the knob in the counter-clockwise direction results in one frame deletion. Not illustrated in the figure is a display unit, which may be any one of a number of conventional display devices (e.g. an LCD display) which indicates the total number of frames or total time value selected by the manual control unit 19 and, if desired, the running total of Δ V and Δ A.

Returning to FIG. 1. a third mode of operation—termed auto mode—is also provided according to the invention. In this mode of operation, the total number of frames or total amount of time to be deleted or inserted is again specified by manual control unit 19: however, the actual choice of which particular frames are to be deleted or inserted and which particular audio segments are to be deleted or inserted, is automatically controlled by a pair of detector circuits. Control of the video frame deletion/insertion is done by a motion detector circuit 40 which incorporates any one of a number of known algorithms for determining the amount of motion change between adjacent frames, and permits deletion/insertion of a given frame whenever the change in motion between the frames does not exceed a selected threshold value. Such circuits are well known and have been used in video compression and coding systems. However, motion detect circuit 40 is constrained to either delete or insert a specified total number of frames over a fixed period of time in accordance with the parameters specified by manual control unit 19. Consequently, motion detect circuit 40 is provided with the accumulated total count from circuit 20, and an internal timing unit (not illustrated) in order to measure the progress of the frame deletion or insertion processing. If the total number of deleted or accumulated frames runs behind the elapsed real time (due to program content with relatively large amounts of motion over a large sequence of frames), the motion detect threshold is automatically raised by motion detect circuit 40 in order to permit a relatively larger number of frames to be deleted or inserted so that the system will succeed in deleting or inserting the desired amount of time over the prescribed total program real time period.

Similarly, a pitch and level detect circuit 50 selects which audio portions contain the most effective frequencies and amplitudes capable of being deleted with minimal impairment to the audio (e.g. by not introducing "pops" or "clicks" into the audio). Pitch and level detect circuit 50 is similarly supplied with the running total from the Δ A circuit 30, and is provided with a threshold adjusting circuit to enable the threshold to be raised if the audio deletion processing is running behind the total elapsed time of the real time program.

The sensitivity threshold of circuits 40 and 50 may also be functionally coupled to the amount of time change desired, as suggested by the diagonal arrows overlying elements 12, 22, 40 and 50. Thus, for a maximum amount of time change, the sensitivity thresholds are raised, while for a minimum amount of time change, the sensitivity thresholds are lowered.

Both motion detect circuit 40 and pitch and level detect circuit 50 are provided with control output lines 42, 52 which are used to control the Δ segment circuits 18, 28 on an on-the-fly basis. Thus, for example, motion detect circuit 40 may determine that three successive frames are to be deleted from the frame sequence: in such a case, a control signal is issued on control line 42 to the Δ segment circuit 18 to delete the three identified successive frames. Similarly, pitch and level detect circuit 50 will determine those audio segments which are to be deleted from frame portions, and issues control signals on control line 52 to the Δ segment circuit 28.

In order to ensure that the total time delay between the time changed output video on terminal 17 and the time changed output audio on terminal 27 does not exceed the preselected maximum frame difference (i.e., ±1 frame time in the preferred embodiment), the accumulated video time and accumulated audio time are coupled from the Δ V circuit 20 and Δ A circuit 30, respectively, via motion detect circuit 40 and pitch and level detect circuit 50 to an A/V phase difference comparator 60. In the event that the video portions and the audio portions on the output terminals 17, 27 are close to the maximum separation difference, the comparator 60 issues control signals on control lines 61, 62 to the motion detect circuit 40 and pitch and level detect circuit 50. These control signals are then used by circuits 40, 50 to select video frames and audio segments for deletion or insertion which steer the A/V difference in the proper direction.

Some program materials may include segments which should not be subject to frame deletion or insertion due to the nature of the subject matter. For example, some commercial providers may require that the commercial programming information not be altered in any way. In such cases, it is useful to provide a pause function which terminates frame deletion and frame insertion until the sensitive programming material has been passed through the signal processing units 12, 22. This function is provided by disabling operation of the Δ segment circuits 18, 28, as well as operation of the manual control 19. The pause function may be implemented in the form of a manually operable switch—e.g. a push button switch—and an indicator specifying the state of the pause function circuit; or may be automatically implemented using appropriate circuitry for detecting predetermined codes or other markers in predetermined portions of the video frames. For example, a special character may be inserted in the vertical blanking interval specifying the first frame in a sequence of frames for which the pause function is required; and an end of sequence special character may be inserted in the last frame. Such a character may be conveniently inserted during non-viewable portions of a frame, such as in the vertical blanking interval. Other specific implementations of the pause function will occur to those skilled in the art.

As will now be apparent, the invention is capable of increasing and decreasing passages of time in programming material by significant amounts, without impairing the subjective quality of the programming materials as viewed. For example, for NTSC video, by deleting one out of every twelve frames, a total of five minutes per hour can be accumulated or "saved" for other purposes. Similarly, by adding an additional frame every six frames in NTSC video, ten minutes per hour can be added to the total running time of programming material. In addition, it should be noted that the removal of audio segments at different points in time from the video frames optimizes the quality of the final video/audio output from the system, since it enables separate alteration of the video and audio portions based on the information content and using techniques which are optimal to video signals and audio signals separately. This ensures that the quality of the finally produced programming material is nearly as high as the original material.

While the above provides a full and complete description of the preferred embodiments of the invention, various modifications, alternate constructions and equivalents may be employed, as desired. For example, while the invention has been described with reference to deletion and insertion of frames of video, these principles apply to deletion and insertion of individual fields of information. Therefore, the above description and illustrations should not be construed as limiting the scope of the invention, which is defined by the appended claims.

APPENDIX

For this machine the following time equations must hold true:

$$\Delta T_V = \sum_{0}^{n} \Delta tv$$

and $$\Delta T_A = \sum_{0}^{an} \Delta t_A$$

Where:
ΔTv=Total accumulated Video delay (+/−) time
ΔTA=Total accumulated Audio delay (+/−) time
Δtv =Time duration of each Video packet (usually one frame)
ΔtA=Time duration of each Audio packet (about 8 mil. sec. for this example)
n=Number of Video packets needed to achieve total time change desired
a=ratio between the time duration of the video and audio packets.

For the machine to work:

ΔTv=ΔTA      1)

or

ΔTA=ΔTV±Δtv      2)

These statements must hold to accomplish the desired time change (+/−) while maintaining lip-sync. Equation 1) holds for exact lip-sync while Equation 2) holds for minimum picture and sound anomalies.

"Time Machine" run modes:
  Manual—where a knob can be turned clock wise or counter clock wise to increase or decrease time in frame increments.
  Auto—where a preset amount of time change (+/−) will automatically accrue where the audio and video can be locked together (ΔTv=ΔTA ) or run independently (ΔTA=ΔTV±Δtv)

"Time Machine" features:
  Time change accrual can be stopped and restarted to coincide with such sacred timed segments as commercials.

Motion, pitch and level change sensitivity can be adjusted to speed up or slow down the rate of time change accrual.
  Maximum number of packet chances per second can be set to minimize excessive changes in time in the Auto mode.

What is claimed is:

1. A method of altering the total running time of an original program signal in real time to generate a time-shortened program signal, the original program signal including an original video program signal that includes a plurality of video frames in sequence, each video frame having a frame time duration Δtv associated therewith, the original program signal also including an original audio program signal that includes a plurality of audio packets in sequence, each audio packet having a packet time duration $\Delta t_A$ associated therewith, the method comprising:
   (a) determining an amount of motion change between selected video frames in said sequence of video frames and video frames adjacent to said selected video frames in said sequence;
   (b) deleting the selected video frames from said sequence of video frames if the amount of motion change between the selected video frame and the adjacent video frame is less than a predefined threshold value, thereby providing a time-shortened video program signal;
   (c) maintaining a total accumulated video delay time ΔTv, where ΔTv equals $\Delta t_v$ multiplied by the cumulative number of video frames deleted from the original video program signal;
   (d) identifying audio packets in said sequence of audio packets that meet a predefined frequency and amplitude criterion;
   (e) deleting one or more audio packets from said sequence of audio packets when said one or more audio packets meet the frequency and amplitude criterion to provide a time-shortened audio program signal and such that the following relationship is maintained:

$\Delta T_A = \Delta T_v \pm m\Delta tv$ where $\Delta T_A$=total accumulated time deleted from the original audio program signal, and
   m=predefined maximum number of video frames; and
   (f) providing the time-shortened video program signal and the time-shortened audio program signal as the time-shortened program signal.

2. A method as in claim 1, and further comprising:
   specifying a total amount of time to be deleted from the original video program signal; and
   discontinuing deletion of video frames from the original video program signal when $$\Delta Tv = \sum_{0}^{n} \Delta tv$$

where n=number of video frames needed to achieve the specified total amount of time to be deleted from the original video program signal.

3. A method as in claim 1, and wherein m=±3.
4. A method as in claim 1, and wherein m=±1.
5. A method as in claim 1, and wherein, in the event that ΔTv runs behind an elapsed real running time of the original video program signal by a predefined time value, raising the predefined threshold valve whereby a relatively larger number of video frames are deleted from the original video program signal.

6. A method as in claim 1, and wherein, in the event that $\Delta T_A$ runs behind an elapsed real running time of the original audio program signal by a predefined time value, changing the frequency and amplitude criterion such that a relatively larger number of audio packets are deleted from the original audio program signal.

7. A method as in claim 1, and further comprising:

identifying selected video frames in said sequence of video frames as sensitive program material; and terminating the video frame deletion step for said identified selected video frames.

8. An apparatus that alters the total running time of an original program signal in real time to generate a time-shortened program signal, the original program signal including an original video program signal that includes a plurality of video frames in sequence, each video frame having a frame time duration $\Delta tv$ associated therewith, the original program signal also including an original audio program signal that includes a plurality of audio packets in sequence, each audio packet having a packet time duration $\Delta t_A$ associated therewith, the apparatus comprising:

(a) a video processor that determines an amount of motion change between selected video frames in said sequence of video frames and video frames adjacent to said selected video frames in said sequence, deletes a selected video frame from said sequence of video frames if the amount of motion change between said selected video frame and an adjacent video frame is less than a predefined threshold value, and maintains a total accumulated video delay time $\Delta Tv$, where $\Delta Tv$ equals the number of video frames deleted from the original video program signal multiplied by $\Delta tv$;

(b) an audio processor that identifies audio packets in said sequence of audio packets that meet a predefined frequency and amplitude criterion and deletes one or more audio packets from said sequence of audio packets when said one or more audio packet meets the frequency and amplitude criterion such that $$\Delta T_A = \Delta Tv \pm m \Delta tv$$

where $\Delta T_A$=total accumulated time deleted from the original audio program signal, and m=predefined maximum number of video frames; and (c) circuitry that provides the time-shortened video program signal and the time-shortened audio program signal as the time-shortened program signal.

9. An apparatus as in claim 8, and further comprising:

means for specifying a total amount of time to be deleted from the original video program signal; and means for discontinuing deletion of video frames from the original video program signal when $$\Delta Tv = \sum_0^n \Delta tv$$

where n=number of video frames needed to achieve the specified total amount of time to be deleted from the original video program signal.

10. An apparatus as in claim 8, and wherein m=±3.

11. An apparatus as in claim 8, and wherein m=±1.

12. An apparatus as in claim 8, and further comprising; means for changing the frequency and amplitude criterion, in the event that $\Delta Tv$ runs behind the elapsed real running time of the original video program signal by a predefined time value, raising the motion detect threshold whereby a relatively larger number of video frames are deleted from the original video program signal.

13. An apparatus as in claim 8, and further comprising, means for, in the event that $\Delta T_A$ runs behind the elapsed real running time of the original audio program signal by a predefined time value, changing the frequency and amplitude criterion such that a relatively larger number of audio packets are deleted from the original audio program signal.

14. An apparatus as in claim 8, and further comprising:

means for identifying selected video frames in said sequence of video frames as sensitive program material; and means for terminating video frame deletion for said selected video frames.

* * * * *

UNITED STATES PATENT AND TRADEMARK OFFICE
CERTIFICATE OF CORRECTION

PATENT NO. : 6,195,387 B1
DATED : February 27, 2001
INVENTOR(S) : Moeller et al.

It is certified that error appears in the above-identified patent and that said Letters Patent is hereby corrected as shown below:

Column 9,
Line 1, "valve" should be -- value --.

Claim 12, should read -- 12. An apparatus as in claim 8, and further comprising: means for raising the predefined threshold value, in the event that $\Delta T_V$ runs behind the elapsed real running time of the original video program signal by a predefined time value, whereby a relatively larger number of video frames are deleted from the original video program signal. --

Claim 13, should read -- 13. An apparatus as in claim 8, and further comprising: means for changing the frequency and amplitude criterion, in the event that $\Delta T_A$ runs behind the elapsed real running time of the original audio program signal by a predefined time value, such that a relatively larger number of audio packets are deleted form the original audio program signal. --

Signed and Sealed this

Twentieth Day of November, 2001

Attest:

*Nicholas P. Godici*

*Attesting Officer*

NICHOLAS P. GODICI
*Acting Director of the United States Patent and Trademark Office*